United States Patent Office 3,265,673
Patented August 9, 1966

3,265,673
COPOLYMERS OF LONG-CHAINED ACRYLIC ESTERS WITH SULFUR CONTAINING ACRYLATES
Harry F. Richards, Concord, Calif., and Stephen A. Herbert, Jr., Weston, Conn., assignors to Shell Oil Company, New York, N.Y., a corporation of Delaware
No Drawing. Filed Dec. 28, 1962, Ser. No. 247,880
7 Claims. (Cl. 260—79.7)

This application is a continuation-in-part of copending application Serial No. 851,978, filed November 10, 1959, now Patent No. 3,100,748.

This invention relates to improved liquid hydrocarbons such as mineral oils, and particularly to engine hydrocarbon lubricants having improved detergency, viscosity index, wear inhibition, as well as enhanced oxidation and corrosion inhibition properties and to new and improved oil additives therefor.

Until recently, lubricants were commonly doped with various oil-soluble metal salts such as polyvalent metal sulfonates, carboxylates, phenates, phosphates, thiocarbamates, and the like. Some of these substances, such as the sulfonates, phenates and carboxylates possess detergent properties, some such as phenates and thiocarbamates are useful because of their antioxidant properties and some such as the phosphates are useful as anti-corrosion additives. In general, these metallic compounds, when subjected to high temperature and high pressure conditions, break down and even act as pro-oxidants, causing deterioration of the oil base resulting in corrosivity, pro-wear, etc. Recently certain non-ash forming oxygen and/or nitrogen-containing polymeric additives have been introduced as oil additives, but these generally lack wear inhibiting and extreme pressure as well as high temperature oxidation inhibiting properties. Attempts to impart these properties to oil containing non-ash forming polymeric detergents by addition of conventional anti-wear and extreme pressure agents have been unsuccessful since such combinations generally tend to form complexes resulting in sludge and deposit formations.

It has now been found that liquid hyrdocarbon compositions are improved with respect to one or more properties such as viscosity index, detergency, oxidation, corrosion, and wear inhibition by a novel class of polymers, namely an oil-soluble polymeric compound having essentially a long linear hydrocarbon backbone chain and attached thereto in a uniform or random fashion two essential polar-containing groups, one being a sulfur-free ester group represented by —COOR, wherein R is a $C_8$–$C_{18}$ alkyl radical and the other polar group being a sulfur-containing ester group represented by

—COOR′—S—R″—Y wherein the R′ and R″ are the same or different $C_2$–$C_{18}$ alkyl radicals, and Y is an acidic-polar group such as a halogen, cyano, mercapto, hydroxyl, carboxyl group, with preferred polar groups being —OH, —SH, and —COOH. Polymeric compounds of this type should have a plurality of at least 8 units selected from

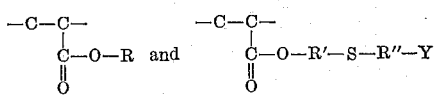

at least two of each, and wherein the R′s and Y are defined as above and the number of units is such that the molecular weight of the polymer ranges from about 5000 to 1,000,000, preferably from about 25,000 to 500,000 as determined by the light scattering technique.

The polymeric compounds of the present invention are readily prepared by various means such as by copolymerizing, in the presence of a suitbale catalyst such as an azo catalyst such as alpha,alpha′-azo-di-isobutyronitrile, esters of long chain alkanols, such as lauryl alcohol and unsaturated acids such as acrylic or methacrylic acids, e. g., a $C_{10}$–$C_{18}$ ester of an acrylic acid with an acrylic acid ester of an omega-acidic polar-substituted thia-alkanol and the like.

The esters of such sulfur-containing alcohols are prepared, for example, by reacting an omega-hydroxy-substituted thia-alkanol with an acrylyl halide such as methacrylyl chloride in the presence of a suitable base such as pyridine or by reacting acetone cyanohydrin with a suitable thia-alcohol in the presence of sulfuric acid. Thus:

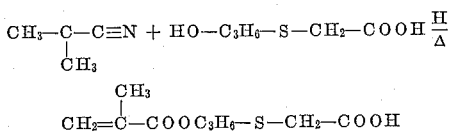

The sulfur-free polymerizable ester monomer is an ester of an acrylic acid, generally containing from 3 to 9 carbon atoms in the acrylate radical, preferably from 3 to 4, being the unsubstituted acrylate and the alpha-methacrylate radicals. Other alpha-substituted acrylate radicals are exemplified by alpha-ethylacrylate and alpha-phenylacrylate. The alcohol used to form the ester is preferably a primary alcohol, although secondary and tertiary alcohols are suitable, containing at least 9 carbon atoms, preferably from 12 to 20, and preferably having a chain of at least 5 carbon atoms. Representative suitable alcohols are: n-octyl, n-lauryl, n-cetyl, n-stearyl, n-oleyl, 2,2,4,4-tetramethylpentyl and 2,2,4,4,6,6-hexamethylheptyl alcohols. Examples of the esters are n-nonyl acrylate, n-lauryl acrylate, n-stearyl acrylate, n-nonyl methacrylate, n-lauryl methacrylate, n-cetyl methacrylate, n-stearyl methacrylate, 2-ethylhexyl methacrylate, 2,2,4,4-tetramethyl lauryl methacrylate, and their mixtures.

The other polymerizable monomer is an acrylic acid ester of an omega-acidic polar-substituted sulfur-containing alcohol such as omega-hydroxy- or omega-carboxyl-substituted ethyl, propyl-, butyl-, amyl-, hexyl-, octyl-, stearyl-thiaethanol, thiapropanol, thiabutanol, thiaoctanol, thiadecanol, etc. Examples of such sulfur-containing esters are 5-hydroxy-3-thiaamyl acrylate, 6-hydroxy-3-thiahexyl methacrylate, 8-hydroxy-4-thiaoctyl acrylate, 5-carboxy-4-thiaamyl methacrylate, 7-hydroxy-4-thiaheptyl methacrylate, 8-carboxy-3-thiaoctyl methacrylate, 12-mercapto-3-thiadodecyl methacrylate, 8-mercapto-4-thiaoctyl methacrylate, 18-mercapto-5-thiastearyl methacrylate, 6-carboxy-3-thiahexyl methacrylate and mixtures thereof.

The copolymers are prepared by polymerizing the two monomers in the mol ratio of 1:10 to 10:1, preferably 1:3 to 5:1 of the sulfur-free acrylate ester to the polar-substituted-thiaacrylate ester, respectively. The reaction is carried out in the presence of a polymerization initiator such as an azo catalyst, in an inert solvent and at a temperature ranging from about 60° to about 150° C., preferably between 80° and 100° C. for a period of from 2 to 48 hours, preferably from 8 to 35 hours so that the sulfur content of the final product ranges from about 1% to about 15%, preferably between 2 and 10% by weight. The solvents are light liquid hydrocarbons such as benzene, xylene, toluene, light mineral oil, etc.

Various combinations of conditions may be employed to maintain the molecular weight within the desired range. Factors which exert an influence on the molecular weight of the polymer include the method of polymerization (e. g., polymerization in emulsion, suspension, solvent solution or bulk), the nature and concentration of the catalyst employed, the temperature, and nature and amount of the particular monomers. When the polymerization is accomplished in solution, the molecular weight of the product will be lower when the dilution is higher, e. g., when the proportion of solvent is greater. With the same catalyst, the higher polymerization temperature tends to give lower molecular weight polymers.

The following examples illustrate the preparation of suitable polymers for use in oil compositions in accordance with the invention.

EXAMPLE I

A mixture of about 2 mols of stearyl methacrylate, 1 mol of 5-hydroxy-3-thiaamyl methacrylate and 0.1% alpha,alpha'-axodiisobutyronitrile was reacted in a benzene solution for a period of about 32 hours at about 80° C. The polymer was dispersed in a benzene-alcohol mixture and then isolated by a precipitation technique. A stearyl methacrylate/5-hydroxy-3-thiaamyl methacrylate copolymer having a sulfur content of 5.56% and a molecular weight in excess of 27,000 was recovered. It had good solubility in mineral lubricating oils and imparted thereto detergent, extreme pressure and wear-inhibiting properties.

EXAMPLE II

A coplymer of stearyl methacrylate and 6-carboxy-3-thiahexyl methacrylate was prepared by the method of Example I, using the reactant monomers in a molar ratio of 2 to 1, respectively. The molecular weight of the copolymer was around 42,000, it had a sulfur content of 3% and was oil-soluble and exhibited good detergent and wear-inhibiting properties.

EXAMPLE III

A copolymer of lauryl methacrylate and 5-mercapto-3-thiaamyl methacrylate was prepared by the method of Example I in which the ratio of the reactants and conditions of the reaction were the same as described in Example I. The polymeric product had a molecular weight of 50,000, a sulfur content of 6% and was oil-soluble and exhibited good detergent and wear-inhibiting properties.

EXAMPLE IV

A copolymer of stearyl methacrylate, lauryl methacrylate and 5-hydroxy-3-thiaamyl methacrylate in the mol ratio of 1:1:1 was prepared by the procedure of Example I except that the reaction temperature was 100° C. The copolymer was oil-soluble and the molecular weight was around 50,000.

Additional improvements with respect to oxidation stability and scuffing inhibition can be imparted to the oil compositions containing the copolymers of this invention. Thus, by incorporating small amounts (0.01–2%, preferably 0.1–1%) of phenolic compounds such as alkylphenol oxidation is effectively inhibited. Such compounds include 2,6-ditertbutyl-4-methyl phenol or p,p'-methylene bisphenols such as 4,4'-methylene (2,6-ditertbutylphenol) or arylamines such as phenol-alpha-naphthylamine and mixtures thereof. Anti-scuffing agents include organic phosphites, phosphonates and their thio-derivatives, such as $C_3$–$C_{18}$ alkyl phosphites, or phosphonates, e.g., di- and tributyl, octyl, lauryl, stearyl, cyclohexyl, benzyl, cresyl, phenyl, phosphites or phosphates, as well as their thio-derivatives, $P_2S_5$-terpene reaction products, e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonates, dibutyl monochloromethanephosphonate, dibutyl chlorobenzene phosphonate, and the like. The full esters of pentavalent phosphorus acids such as triphenyl, tricresyl, trilauryl and tristearyl ortho phosphates or potassium salt of $P_2S_5$-terpene reaction product are preferred. These additives are also used in the concentrations as noted from the phenolic compounds.

The sulfur-containing polymeric additives of this invention improve various petroleum products by the incorporation of a minor amount (0.001% to 10%, preferably 0.1% to 5% by weight) of the additive. Thus, they may be used to improve gasoline, jet fuels, transformer oils, turbine oils, mineral lubricating oils, industrial oils such as hydraulic fluids, metal working fluids and quenching fluids. The sulfur-containing polymers are particularly useful in refined mineral lubricating oils, which may range from SAE 5W viscosity grade to SAE 140 grade and which may be derived from paraffinic, naphthenic or asphaltic base crudes. Representative oils are refined high viscosity index mineral oils having a viscosity at 100° F. of 100 to 250 SUS. A typical mineral lubricating oil (X) of this type had the following properties:

| | |
|---|---|
| Gr. ° API, 60/60° F. | 32 |
| Flash, ° F. | 370 |
| Viscosity index (Dean and Davis) | 93 |
| Viscosity, SUS at 100° F. | 103 |

The following non-ash compositions are representative of this invention.

Composition A: Percent wt.
    Example I copolymer _____ 2
    Mineral lubricating oil (X) _____ Balance Composition B:
    Example II copolymer _____ 2
    Mineral lubricating oil (X) _____ Balance Composition C:
    Example III copolymer _____ 2
    Mineral lubricating oil (X) _____ Balance Composition D:
    Example IV terpolymer _____ 2
    Zn dialkyl dithiophosphate _____ 0.75
    Zn dibutyl dithiocarbamate _____ 0.50
    Mineral lubricating oil (X) _____ Balance Composition E:
    Example I copolymer _____ 6
    K salt of $P_2S_5$-terpene reaction product ____ 0.8
    Mineral lubricating oil (X) _____ Balance Composition F:
    Example I copolymer _____ 3
    4,4'-methylene bis(2,6-ditertbutylphenol) __ 1
    Mineral lubricating oil (SAE 30) _____ Balance Composition G:
    Example I copolymer _____ 5
    4,4'-methylene bis(2,6-ditertbutylphenol) __ 0.5
    Tricresyl phosphate _____ 0.8
    Mineral lubricating oil (X) _____ Balance Composition H:
    Example I copolymer _____ 5
    4,4'-methylene bis(2,6-ditertbutylphenol) __ 0.5
    $P_2S_5$-terpene reaction product _____ 1
    Mineral lubricating oil _____ Balance Composition I:
    Example I copolymer _____ 2
    Fuel oil (No. 2) _____ Balance To illustrate the superior and unexpected results obtained with compositions of the present invention, the following compositions were tested for the following properties (1) IV (viscosities at 100° F. and 210° F.) and (2) corrosion inhibition as determined by the Cu Strip Corrosion Test (ASTM procedure); (3) Extreme pressure (Hertz Mean Load, Kg); and (4) Engine Test: Oldsmobile Engine Scuffing Test under the following test conditions: 2400 r.p.m., crankcase oil temperature —200° F.; (5) Chevrolet Modified EX–3 (V–8) sludging test CRC Progress Report No. 3, June 1957; and (6) Chevrolet L–4 Test (CRC Handbook) with results as shown in Table I.

Table I

| Composition | VI | Mean Hertz Load, kg. | Copper Strip Corrosion | Oldsmobile Scuffing Test Mean Wear, 1/1000 in. | | Visual Lifter Rating |
| --- | --- | --- | --- | --- | --- | --- |
| | | | | Cam | Lifters | |
| A | 135 | 27.2 | 1A | 0.4 | 0.6 | 6.5 |
| Mineral Oil | 93 | 14 | 1A | Catastrophic wear >100 | | |

CHEVROLET V-8 SLUDGING

| Composition | Piston Varnish | Total Varnish | Total Sludge | Final Rating | Wear, mg. |
| --- | --- | --- | --- | --- | --- |
| A | 9.4 | 44.5 | 75.3 | 91.5 | 378 |
| Mineral lubricating oil+2% of copolymer of lauryl methacrylate/vinyl pyrrolidone | 8.5 | 40.5 | 66.8 | 82.2 | |
| Mineral lubricating oil+2% of lauryl methacrylate/allyl alcohol, 50% esterified with stearic acid | 7 | 38.8 | 57.9 | 75.0 | |

CHEVROLET L-4 TEST

| Composition | Piston Varnish | Total Varnish | Total Sludge | Final Rating | Wear, mg. |
| --- | --- | --- | --- | --- | --- |
| E | 9.2 | 48.0 | 48.9 | 97.5 | 248 |
| Mineral lubricating oil+2% of copolymer of lauryl methacrylate/vinyl pyrrolidone | 8.5 | 47.6 | 46.6 | 94.2 | 3,595 |
| Mineral lubricating oil+2% copolymer of styrene/allyl alcohol, 50% esterified with stearic acid | 8.1 | 45.5 | 46.7 | 92.2 | 4,004 |

Comparable results to composition A are also obtained with compositions B, C and F when these compositions are tested under the test conditions described above.

Lubricating compositions of this invention are particularly applicable for high temperature, high speed use as in aviation engines, automotive engines, truck engines as well as industrial equipment.

We claim as our invention:

1. A new oil-soluble copolymer useful as a mineral lubricating oil additive, said copolymer being a copolymer of an acrylate ester of an acrylic acid and a $C_8$–$C_{18}$ alkanol and a sulfur-containing acrylate ester having the formula

wherein R' and R" are $C_2$–$C_{18}$ alkyl radicals, R''' is selected from the group consisting of hydrogen and a methyl radical and Y is selected from the group consisting of —OH, —COOH, C=N and —SH radicals, said copolymer having a molecular weight of at least 5000.

2. A new oil-soluble copolymer useful as a mineral lubricating oil additive, said copolymer being a copolymer of an ester of methacrylic acid and a $C_8$–$C_{18}$ alkanol and a methacrylate of the formula

wherein R' and R" are $C_2$–$C_{18}$ alkyl radicals, said copolymer having a molecular weight of at least 5000.

3. A new oil-soluble copolymer useful as a mineral lubricating oil additive, said copolymer being a copolymer of an ester of methacrylic acid and a $C_8$–$C_{18}$ alkanol and a methacrylate of the formula

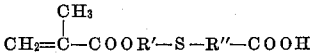

wherein R' and R" are $C_2$–$C_{18}$ alkyl radicals, said copolymer having a molecular weight of at least 5000.

4. A new oil-soluble copolymer useful as a mineral lubricating oil additive, said copolymer being a copolymer of stearyl methacrylate/5 - hydroxy - 3 - thiaamyl methacrylate, said copolymer having a molecular weight of at least 5,000.

5. A new oil-soluble copolymer useful as a mineral lubricating oil additive, said copolymer being a copolymer of stearyl methacrylate/6 - carboxy - 3 - thiahexyl methacrylate, said copolymer having a molecular weight of at least 5,000.

6. An oil-soluble copolymer of lauryl methacrylate and 5 - mercapto - 3 - thiaamyl methacrylate, said copolymer having a molecular weight of at least 5,000.

7. An oil-soluble copolymer of stearyl methacrylate, lauryl methacrylate and 5 - hydroxy - 3 - thiaamyl methacrylate, said copolymer having a molecular weight of at least 5,000.

References Cited by the Examiner
UNITED STATES PATENTS

| | | | |
| --- | --- | --- | --- |
| 3,031,436 | 4/1962 | Prager et al. | 260—79.7 |
| 3,052,657 | 9/1962 | Calhoun et al. | 260—79 |
| 3,165,501 | 1/1965 | Krukziener | 260—79.7 |

JAMES A. SEIDLICK, *Primary Examiner.*

E. J. SMITH, *Assistant Examiner.*